May 13, 1930.  G. W. KNIGHT  1,758,749
VOLTAGE CUT-OUT DEVICE
Filed April 2, 1926  2 Sheets-Sheet 1

INVENTOR.
George W. Knight
BY
Erwin, Wheeler & Woolard
ATTORNEYS

May 13, 1930. G. W. KNIGHT 1,758,749
VOLTAGE CUT-OUT DEVICE
Filed April 2, 1926 2 Sheets-Sheet 2
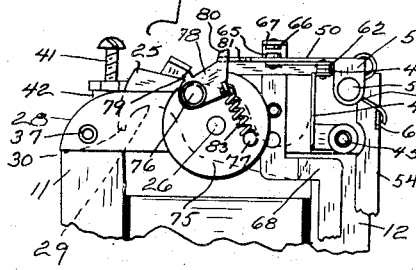
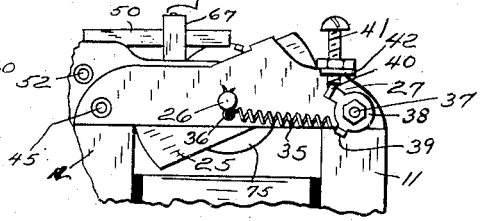
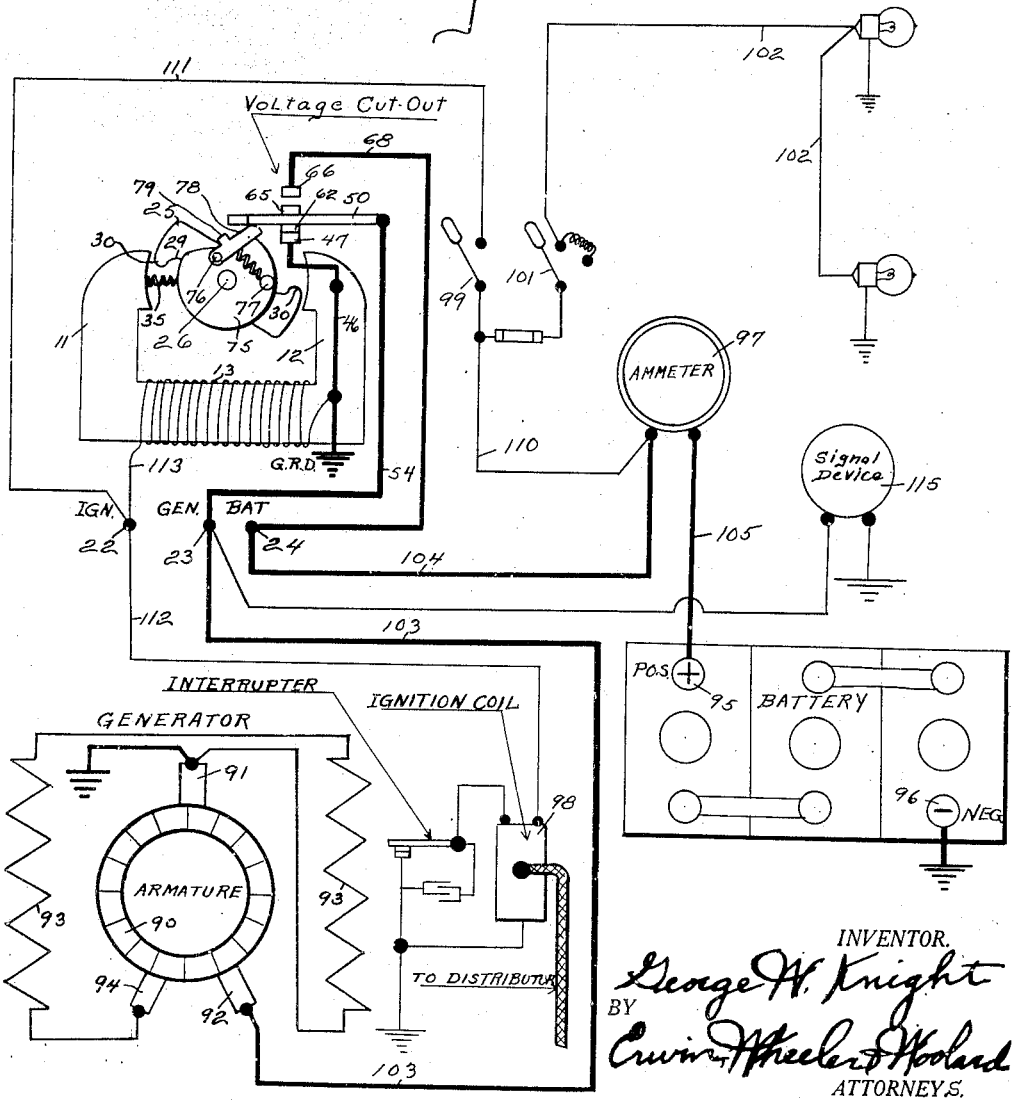
INVENTOR.
George W. Knight
BY
Erwin, Wheeler & Woolard
ATTORNEYS.

Patented May 13, 1930

1,758,749

UNITED STATES PATENT OFFICE

GEORGE W. KNIGHT, OF MILWAUKEE, WISCONSIN

VOLTAGE CUT-OUT DEVICE

Application filed April 2, 1926. Serial No. 99,242.

This invention relates to improvements in a voltage cutout device and circuits therefor. This application is a continuation in part of an application filed by me March 21, 1922, Serial No. 545,609, and entitled Voltage relay for preventing overcharging of batteries.

It is the primary purpose of this invention to provide a simplified means for preventing injury to the battery, generator, lights, and other appliances of motor vehicles, but the device has a wider application and may also be used in other connections to control the charging of batteries and to prevent injury to the batteries or to other devices connected in circuit therewith.

Because of the fact that the primary purposes of the invention relate to the development of motor vehicle equipment, it is a further important object of the invention to provide a mechanism upon which the effect of road shock will be minimized and upon which jolts and vibrations will not act in such a manner as to disturb the delicacy of its adjustment or operation.

Another very important consideration having to do with the application of the invention to the automotive field consists in the desirability of applying the device to existing motor vehicle circuits with a minimum of change. It is a purpose of the invention to devise an instrument such that it need merely be inserted into one of the circuits of a motor vehicle by breaking such circuit and connecting its ends to the instrument, no additional wiring being necessary. In other words, it is my purpose to provide a self-contained instrument adapted for application in standard motor vehicle electrical circuits and so devised that if inserted at the proper point in such a circuit it will take advantage of the characteristics of other pieces of apparatus in the circuit to effect results not heretofore experienced in this field.

More specifically stated, it is my object to provide a voltage coil capable of controlling the output of the generator when merely inserted in the charging circuit between the generator and battery and capable of preventing the overcharging of the battery or overload at any time upon the generator or lamps, these important results being obtained without any drain whatever on the battery at such times as the generator is not functioning.

In the drawings:

Figure 7 is a view similar to Figure 6 showing such cam in an inoperative position during its return movement.

Figure 8 is a detail view of the tensioning device of the armature.

Figure 9 is a circuit diagram showing the application of this instrument.

Like parts are identified by the same reference characters throughout the several views.

The instrument

Figure 2:
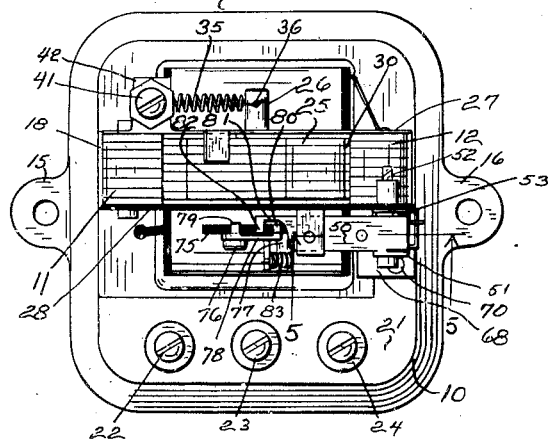
Figure 2 is a plan view of the instrument.
Figure 5:
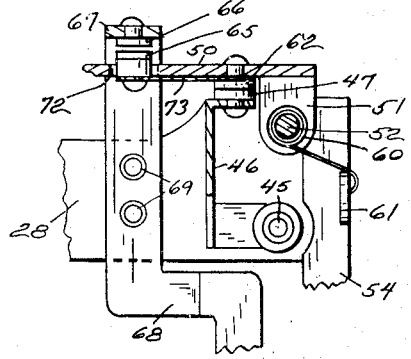
Figure 5 is an enlarged detail view taken on the section indicated at 5—5 in Figure 2.

The instrument comprises in effect a two-way switch controlled by a volt meter. The mechanical assembly includes a base 10 which may be made out of pressed metal to support the pole pieces 11 and 12, coil 13 and the operating parts of the device. A depression may be formed as at 14 in the base member to receive the coil, and the base member may be provided integrally with ears 15 and 16 to facilitate its mounting. The laminated pole pieces 11 and 12 are held to the base by socket members 18 riveted to the pole pieces as shown and provided integrally with ears 19 received through slots in the base and upset therebeneath, as clearly indicated in Figures 3 and 4. Suitable strips 20 and 21 of insulating material extend along one side of the base and carry the several terminals 22, 23 and 24 out of contact with the base.

The armature 25 is a balanced device mounted for oscillation upon a shaft 26 carried by bridge members 27 and 28 connecting the two pole pieces. Bridge member 27 is preferably made of brass, but bridge member 28 is preferably made of dielectric material to facilitate the mounting of other parts. The armature 25 preferably has portions cut away as at 29 in order to concentrate the magnetic flux to the point of saturation in its apices 30, thereby rendering the effect of the magnets on the armature more uniform throughout its path of oscillatory movement.

Figure 1:
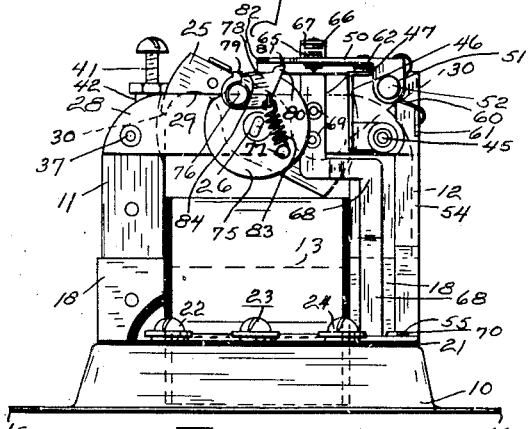
Figure 1 is a side elevation of an instrument embodying this invention.

The armature is normally maintained in the position in which it appears in Figure 1 by the adjustable tension of a spring 35 which may be secured to the armature shaft 26 by means of a cotter pin 36 extending through an aperture in such shaft. A bolt 37 used to connect the bridge members 27 and 28 to pole piece 11 also serves as a mounting for an oscillatory anchorage 38 which preferably has two arcuately spaced and axially projecting arms 39 and 40. Spring 35 is connected with arm 39 and upon the other arm bears an adjusting set screw 41 threaded through a bracket member 42 which may be formed integrally with the brass bridge plate 27. When the screw is turned down it oscillates the fitting 38 and thereby increases or decreases the tension on spring 35. This adjustment serves to regulate the device to operate at various battery voltages.

The bolt 45 which secures bridge members 27 and 28 to pole piece 12 carries the ground terminal 46 which is bent from a piece of strip metal and is provided with a contact button 47. The entire frame of the instrument is grounded. It is possible to accomplish this merely by mounting it on the metal dash board or some other metal part of the vehicle.

Insulated from the metallic frame parts of the instrument by means of its mounting on the fiber bridge member 28 is the moving switch contact arm 50 which is pivoted by means of downwardly extending ears 51 upon a bolt 52 which is securely held by nuts 53 to the dielectric bridge member 28. Anchored behind one of the nuts 53 is a strip conductor 54 which leads downwardly to the fiber strip 21. A rivet 55 extends through this strip and strip 20, (being insulated thereby from the base member 10) and affords electrical connection with the strip conductor 57 which passes beneath the base to the under side of terminal 23. This is the terminal which is connected to the generator, and accordingly the contact arm or lever 50 carries the generator output.

A spring 60 is wound upon the bolt 52 and has its projecting ends engaged respectively with lever 50 and with an arm 61 carried by the strip conductor 54. This spring presses lever 50 downwardly and urges its contact button 62 into engagement with the fixed contact 47 which is grounded. Accordingly, in the normal position of the parts, as shown in Figure 1, the generator output is grounded.

Figure 3:
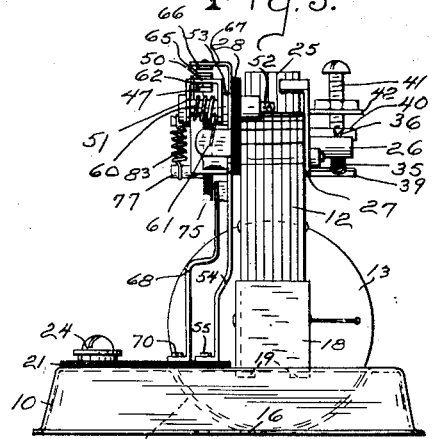
Figure 3 is a side elevation thereof.
Figure 4:
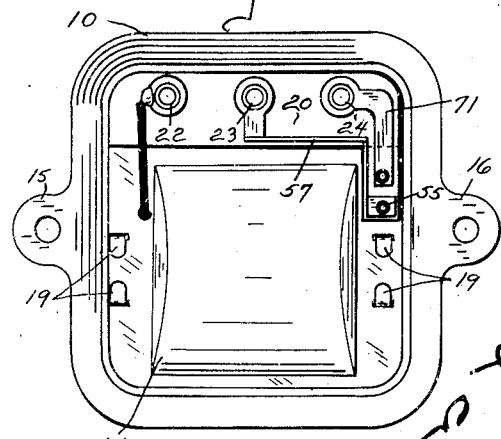
Figure 4 is a bottom view of the instrument.

The movable contact arm 50 also carries a yieldably mounted contact 65 positioned for engagement with a fixed contact 66 carried by the overhanging arm 67 of strip conductor 68. This conductor is riveted at 69 to the dielectric bridge member 28 and passes downwardly as shown in Figures 1 and 3, to the base of the device where it is connected by a rivet 70 through the base 20 to a short conductor 71 leading to terminal 24. This is the battery terminal, and it will be obvious that when contact arm 50 is lifted its yieldably mounted contact 65 will engage the fixed contact 66 to establish a connection with the battery, and the circuit between contacts 62 and 47 will be broken so that the generator output is no longer grounded but is delivered to the battery.

The resilient mounting of contact 65 may be achieved by providing arm 50 with a hole 72 and locating the contact button 65 centrally within said hole and supported by a spring 73 which may be riveted by means of contact 62 to the arm 50.

A one-way cam device connected with the armature 25 controls the position of the contact lever 50. This cam device is arranged to pass below the co-acting part of the contact lever in one direction of movement and to pass above such lever in the other direction of movement. Thereby it acts upon the contact lever in but one direction of movement, and during its retractive movement it leaves the contact lever in its grounded position. This is important for reasons that will be explained in connection with the electrical circuits involved. The present embodiment of the one-way cam consists of a disk 75 mounted on the end of armature shaft 26 and carrying a pivot pin 76 and an anchorage pin 77. The cam member 78 is pivoted upon pin 76 and includes integrally a stop lug 79 and a cam nose 80. The contact lever 50 is cut away at 81 to permit the passage of the cam nose and is provided at 82 with a finger adapted to be acted upon by the cam nose during the advance movement of disk 75, and to act upon the cam nose in the retractive oscillation of said disk. A tension spring 83 holds the cam 78 down to the extent permitted by stop 79 which abuts a shoulder 84 on disk 75 and as the cam lever is pulled clockwise by the spring 83.

Figure 6:
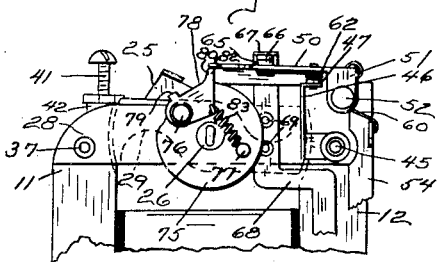
Figure 6 is a detail in side elevation showing the battery charging position of a one-way cam embodied in the instrument shown in Figure 1.

As armature 25 is drawn toward a horizontal position by the magnetism produced in poles 11 and 12 by the induction of the voltage coil 13, the disk 75 is caused to oscillate in a counter-clockwise direction, whereby the nose portion 80 of the cam lever 78 contacts with the under surface of finger 82 of lever 50. As the parts reach the position in which they appear in Figure 6, the nose of the cam has elevated the co-acting finger 82 and lever 50 to open the ground circuit and to close the circuit between terminals 24 and 23 so that current is being delivered to the battery from the generator. This is the normal charging position of the parts, and it will be noted that as the parts approach this position they are in substantially perfect balance so that there is little if any tendency for shocks or vibrations in any direction to disturb them. In order further to resist vibrations or shocks, it is preferred also to make the strip conductor shown herein of magnetic material such as cold rolled steel. Such conductors, and particularly the contact lever 50, will tend to establish a path for magnetic flux between the poles 11 and 12, and will acquire a certain degree of magnetism which will act as a drag tending to prevent the separation of cam nose 80 from finger 82. This magnetic drag, slight as it is, effectually resists vibration and is of sufficient advantage to warrant the departure from the more usual practice of making electrical conductors of copper or brass.

When the voltage impressed across the terminals of coil 13 exceeds a predetermined value so that the armature 25 is drawn practically horizontal, cam nose 80 will clear finger 82 and will allow lever 50 to drop to its grounded position.

If the voltage drops slightly as it does when the generator ceases to operate or is slowed down materially, cam 78 will not operate to lift lever 50. As the armature moves toward its Figure 1 position in a clockwise direction, disk 75 is rotated to retract cam lever 78 and the cam nose 80 engages the extremity of fingers 82. The direction of engagement between these parts is such as to lift cam lever 78, and there is no tendency for the cam nose piece 80 to pass below finger 82. Ultimately the lowered voltage will result in the parts reaching the position in which they appear in Figure 7, and if the voltage is further lowered the cam nose piece 80 will drop through the recess 81 in the contact lever to its original position, as shown in Figure 1. In this position it is again ready to lift the contact lever during its advance movement, but it never lifts the contact lever during its retractive movement.

The voltage coil 13 may be connected between terminal 22 and the ground, as shown in Figure 9 circuit. The particular connection of the voltage coil will depend upon the character of the vehicle circuits with which this device is to be used.

*Electrical circuits*

In the circuit diagram, Figure 9, the generator is designated on the drawings and includes an armature 90, a grounded negative brush 91, and a main positive brush 92. The generator field windings 93 are connected in series between the negative brush 91 and a third brush or auxiliary positive brush 94. This arrangement enables the generator automatically to control its own voltage as long as current is flowing through circuits including the armature windings, positive brush 92 and the ground. Such current flow through the armature distorts the flux path to control the output through the third brush 94 and the field windings 93, and thereby cuts down the current output as soon as it tends to become excessive. If, however, the output of the main brush 92 is interrupted, such high voltages will build up in the armature circuit as will tend to burn the armature windings. In many motor vehicles an automatic cutout to the battery is eliminated by charging through the ignition switch so that when the ignition is shut off the charging circuit is likewise broken. Under such circumstances, if the ignition switch is open while the generator is in rapid operation, the result may be burned out lights in the lighting circuit, or a burned out generator. The present invention is designed to eliminate this possibility.

The drawing also shows a storage battery having positive terminal 95 and a grounded negative terminal 96. I have also illustrated diagrammatically at 97 an ammeter; at 98 I have shown diagrammatically an ignition coil; at 99 I have shown the ignition switch; at 101 the lighting switch, and at 102 the lighting circuit including ordinary incandescent bulbs.

The charging circuit includes positive brush 92, conductor 103, terminal 23, and conductor 54 to contact lever 50. In the Figure 1 position of the contact lever the circuit will be completed through contact 47 and conductor 46 to ground. In the Figure 6 position of contact lever 50 the charging circuit will be effective from the contact lever through contact 66, conductor 68, terminal 24, conductor 104, ammeter 97, and conductor 105 to the battery and thence to the ground.

Shunted across the charging circuit and the battery is a circuit including conductor 110, ignition switch 100, and conductor 111 leading to the instrument terminal 22. At this point the shunt becomes double, conductor 112 leading to the ignition coil 98 and to the ground and conductor 113 leading to the voltage coil 13 and thence to the ground.

Aside from the lighting circuit which follows the usual arrangement, this completes the electrical circuits including the instrument above described. It is particularly to be noted that the voltage or potential coil 13 must necessarily be shunted across the battery in order that it may operate in accordance with the voltage of the battery. This would mean that there would be a constant loss of current through the potential coil if it were not for the fact that the connection thereto is established through the ignition switch and hence is operative only when the ignition switch is closed and the generator presumably in operation. By virtue of this arrangement (which is also disclosed in my earlier application) there is no discharge from the battery when the vehicle is not in use and yet the instrument establishes control of the charging current as soon as the ignition switch is closed to set the generator in operation.

It will be noted, furthermore, that as long as the ignition switch is open and the voltage coil 13 is de-energized, the contact lever 50 must remain in its grounded position, in which contacts 65 and 66 are separated. Thus, although charging does not take place through the ignition switch, the ignition switch nevertheless operates to open the charging circuit and the battery is relieved of drain through the generator without any necessity for using an automatic cut-out.

*Operation*

While the foregoing description has made the operation of the device clear to those skilled in the art, a brief résumé will be given at this point.

The instrument herein disclosed is intended for use in connection with generators which are self-regulating as to voltage while their output remains uninterrupted. It is particularly to be noted that protection for the battery, the generator, and the lights is established through the use of a self-contained instrument which acts as an interrupter for the generator output.

With the generator at rest the parts will appear as shown in Figure 1 of the drawings. The contact lever 50 is in a position such as to ground the generator output.

Assuming the installation to be in a motor vehicle, it will be obvious that the closing of the ignition switch is a prerequisite to generator operation and that until the ignition switch is closed the voltage coil will be de-energized. When the ignition switch is closed the battery immediately begins to supply current through the voltage coil to ground and thereby the poles 11 and 12 of the instrument are so energized as to oscillate the armature slightly in a counter-clockwise direction as viewed in Figure 1. The one-way cam thereupon acts to lift lever 50. This operation breaks the ground connection from the generator and establishes the charging circuit through contact 65 and 66 to the ammeter and the battery.

If the battery is not fully charged this circuit will remain established throughout the operation of the generator. When the ignition switch is opened at any time the voltage coil will be de-energized and the generator circuit promptly grounded.

Ultimately the battery will reach such a condition of charge that the voltage impressed upon coil 13 during a period when the ignition switch is closed will be adequate to rotate armature 25 against the tension of spring 35 to the point where the cam nose member 80 will pass beyond the co-acting finger 82 of the contact lever 50. Thereupon the contact lever 50 will drop to establish a ground connection for the generator output and to break the charging circuit to the battery. When this condition is once achieved the generator will remain grounded until the ignition switch is again opened. This would be true even if the battery voltage dropped below the value necessary to maintain the armature in its most advanced position, since the one-way action of cam lever 78 is such that the cam does not operate the contact lever during its retractive movement. This, however, is very valuable in connection with the proper treatment of the battery since it is well known that a battery kept at substantially constant voltage deteriorates from hardening of its plates, and that in order to keep the plates in the best possible condition there must be a more or less continuous cycle of charging and discharging of the battery. While it is not the main purpose of the one-way cam 78 to perform this function, nevertheless its operation in this regard is valuable.

Assuming the armature to be in its advanced position which it reaches at such time as the voltage of the battery indicates full charge, the opening of the ignition switch will de-energize the voltage coil and permit a retractive movement of the armature and associated parts. It is the custom of many operators of motor vehicles to speed up their engines before opening the ignition switch in order to prime the cylinders with a charge of unburned fuel. Where the ignition switch controls the charging circuit it is known that such practices may result in the development of as much as 90 volts across the terminals of a 6 volt generator. It is one of the functions of the oneway cam device 78 to prevent such destructive voltages. It will be noted that whenever the ignition switch is opened the contact lever 50 is immediately grounded if it has not already been grounded. Moreover, if the contact lever is grounded by virtue of a full charge in the battery, the retractive movement of the armature does not break the ground but allows it to be maintained by permitting the cam to pass over instead of under the cam follower or finger 82. Thus, the output of the generator is not interrupted even though the ignition switch be opened while the generator is still in operation.

I claim:

1. An instrument comprising an armature fulcrumed for oscillation, a potential coil associated with said armature for the influence thereof, a fixed contact, a magnetizable contact lever provided with a circuit controlling contact engageable with said fixed contact, and a cam of magnetizable material connected with said armature and arranged for interaction with said lever for the control thereof, said cam and lever being adapted to form a partial bridge path across the magnetic field established by said coil, whereby to counteract the effect of shock on said armature.

2. An instrument comprising a core having opposed pole pieces, a voltage coil energizing said pole pieces, an armature transversely fulcrumed between said pole pieces, a switch actuating part carried by said armature, and a switch provided with a portion adapted to be engaged by said part, said switch extending between said pole pieces and said switch and part being formed of magnetizable material, whereby to establish a limited degree of attraction between said switch and part in opposition to vibrations tending to separate said switch and part.

3. An instrument comprising a voltage coil, a normally retracted armature subject to the influence of said coil and adapted to be advanced by the magnetism of said coil as the voltage therein increases, a switch, and a one-way cam connected with said armature and arranged to act upon said switch in the direction of advance of said armature and to leave said switch stationary during the retractive movement of said armature.

4. In a instrument of the character described, the combination with an armature mounted for oscillation and provided with a shaft, of a supporting member carried by said shaft, a cam pivoted to said member at a point radially remote from said shaft, a stop limiting the pivotal movement of said cam toward said shaft, a spring urging said cam toward said shaft, and a switch provided with a part adapted to interact with a portion of said cam, said switch part and cam portion being arranged for contact during the oscillation of said cam and being so formed that said switch part will ride upon said cam during the advance movement of said armature and said cam portion will ride upon said switch part during the retractive movement of said armature.

5. In a device of the character described, the combination with an armature mounted for movement and a pivoted cam mounted for bodily oscillation with said armature, of a pivotally mounted switch, a laterally projecting finger on said cam, a spring normally pressing said switch toward the path of movement of said cam, and a spring normally retracting said cam, said fingers being so formed as to present during the advancing movement of said cam a surface inclined in a direction to lift said switch and subsequently to allow said switch to fall, the opposing surfaces presented by said fingers during the retractive movement of said cam being adapted to lift said cam upon said switch and subsequently to allow said cam to fall.

6. In a device of the character described, the combination with opposing pole pieces bridged by a dielectric member, of an armature shaft extending through said member, an armature on said shaft, a set of opposed fixed contacts, one of which is supported by said member, and which are mutually insulated thereby; and a switch pivotally mounted in insulated relation to both of said contacts and provided with movable contact means alternatively engageable with said fixed contact, said armature and shaft being provided with means for the actuation of said switch between its alternative positions for such engagement.

7. In a device of the character described, the combination with opposing pole pieces bridged by a dielectric member, of an armature shaft extending through said member, an armature on said shaft, a set of opposed fixed contacts, one of which is supported by said member, and which are mutually insulated thereby; and a switch pivotally mounted in insulated relation to both of said contacts and provided with movable contact means alternatively engageable with said fixed contact, said armature and shaft being provided with means for the actuation of said switch between its alternative positions for such engagement, said means including a one-way cam adapted during the advancing oscillation of said armature to lift and subsequently to drop said switch and during the return movement of said armature to be lifted by and subsequently dropped by said switch.

8. In a device of the character described, the combination with opposing pole pieces bridged by a dielectric member, of an armature shaft extending through said member, an armature on said shaft, a set of opposed fixed contacts, one of which is supported by said member, and which are mutually insulated thereby; and a switch pivotally mounted in insulated relation to both of said contacts and provided with movable contact means alternatively engageable with said fixed contact, said armature and shaft being provided with means for the actuation of said switch between its alternative positions for such engagement, said switch and switch actuating means being formed of magnetic material and extending in a direction to provide a partial flux path between the said poles, whereby to be subject to a restraining magnetism in opposition to any vibration tending to separate said switch and actuating means.

9. In an instrument of the character described, a switch lever provided with a plurality of contact buttons, one of said buttons being mounted on a spring connected with said lever by the other of said buttons.

10. In an instrument of the character described, a switch lever provided with an aperture, a contact button centered in said aperture, a yieldable spring member supporting said contact button, and a second contact button securing said spring member to said lever at a point remote from said aperture.

11. In a device of the character described, the combination with a switch including fixed and movable contacts and actuating means for said movable contact comprising an oscillatory armature and a spring connected therewith and tending to oscillate the armature in a given direction, of a rotatable anchorage for said spring including a pair of arcuately spaced arms, said spring being engaged by one of said arms, and an adjusting screw engaged with the other of said arms and disposed in a chord of the arc through which said arm moves during the rotation of said anchorage in a direction to increase the tension of said spring.

12. In an instrument of the character described, the combination with a voltage coil and pole pieces energized thereby, of a dielectric bridge between said pole pieces, an armature supported for oscillation between said pole pieces and provided with a switch actuating element, a switch lever provided with a contact and pivoted for engagement by said element, a base for said pole pieces provided with suitable terminals, and a set of strip conductors electrically connected with respective terminals on said base and connected with said dielectric bridge to receive support therefrom while insulated from each other, one of said conductors carrying a contact adapted to be engaged by said switch lever.

13. An instrument comprising the combination with a coil and an armature therefor, of a switch including a fixed contact and a movable contact, and one-way cam means adapted to transmit armature movement to said moving contact in a direction to operate said switch when said armature is moved, said means being adapted to leave said switch inoperative in the opposite movement of said armature.

14. An instrument comprising the combination with a core, a coil, and an armature normally retracted and adapted to be drawn to said core in accordance with the energization of said coil; of a switch including fixed and movable contacts; and one-way actuating connections from said armature to the movable switch contact including a pair of interacting relatively yieldable parts respectively connected to the armature and said movable contact, and stop means supporting one of said parts in a position such that it will yieldably engage the other part in one direction of relative movement and will nonyieldably engage the other part for transmission of motion to said switch contact in the other direction of relative movement.

GEORGE W. KNIGHT.